A. F. MITCHELL & W. H. JONES.
PROCESS OF TREATING ARMOR PLATES.
APPLICATION FILED MAR. 24, 1910.
1,100,193.
Patented June 16, 1914.
3 SHEETS—SHEET 1.
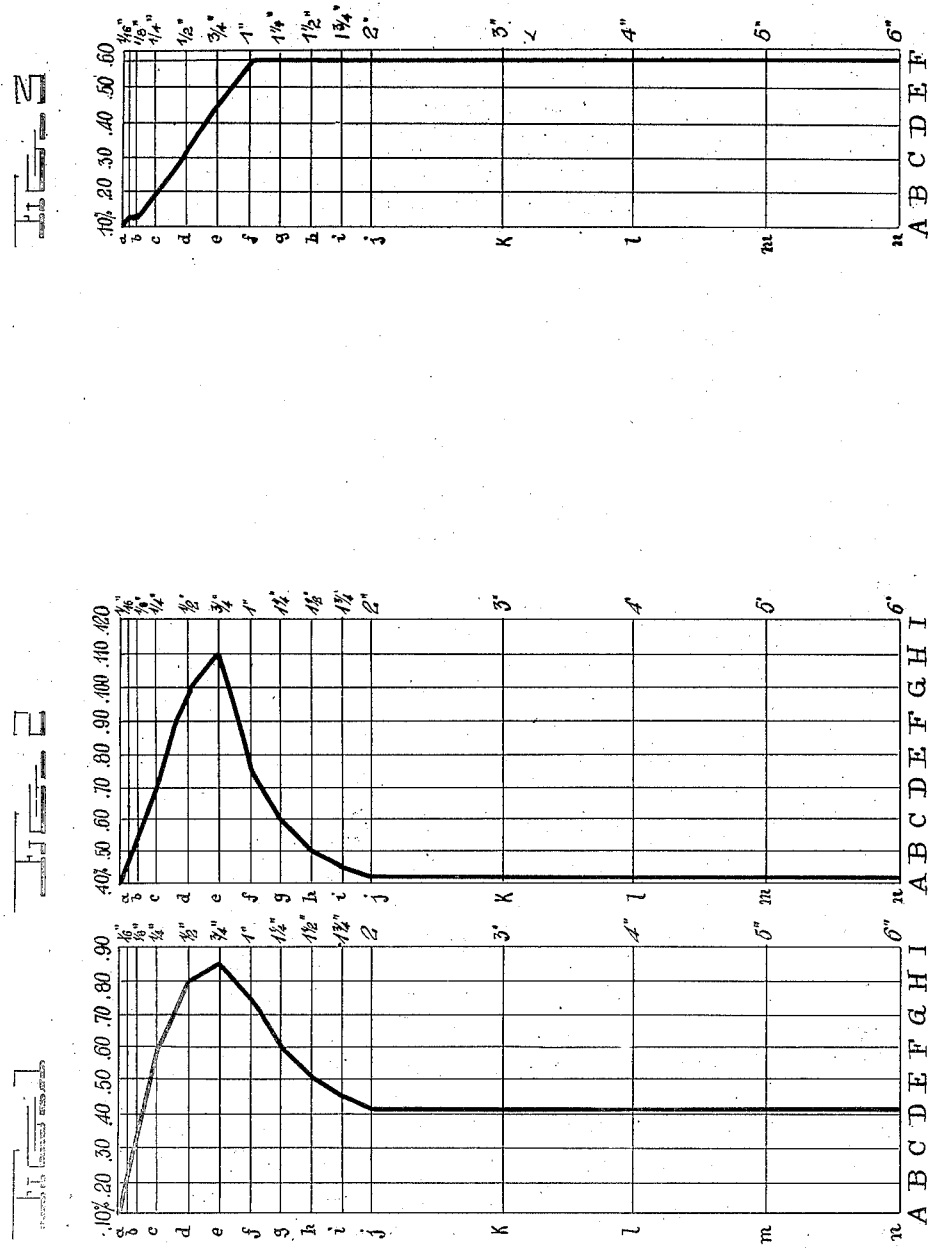
Witnesses
Inventors
A. F. Mitchell
and W. H. Jones
by H. B. Willson & Co
Attorneys A. F. MITCHELL & W. H. JONES.
PROCESS OF TREATING ARMOR PLATES.
APPLICATION FILED MAR. 24, 1910.

1,100,193.

Patented June 16, 1914.

2 SHEETS—SHEET 2.

Witnesses

Inventor
A. F. Mitchell
and W. H. Jones
by H. B. Willson & Co.
Attorneys

UNITED STATES PATENT OFFICE.

ANDREW F. MITCHELL, OF PITTSBURGH, AND WILLIAM H. JONES, OF MUNHALL, PENNSYLVANIA, ASSIGNORS TO CARNEGIE STEEL COMPANY, OF PITTSBURGH, PENNSYLVANIA, A CORPORATION OF NEW JERSEY.

PROCESS OF TREATING ARMOR-PLATES.

1,100,193.     Specification of Letters Patent.     Patented June 16, 1914.

Application filed March 24, 1910. Serial No. 551,297.

*To all whom it may concern:*

Be it known that we, ANDREW F. MITCHELL, a citizen of the United States, residing at Pittsburgh, Allegheny county, Pennsylvania, and WILLIAM H. JONES, a citizen of the United States, residing at Munhall, in the county of Allegheny and State of Pennsylvania, have invented certain new and useful Improvements in Processes of Treating Armor-Plates; and we do declare the following to be a full, clear, and exact description of the invention, such as will enable others skilled in the art to which it appertains to make and use the same.

Our invention relates to the treatment of steel and alloy steel after being formed into plates and similar articles.

One object of our invention is to provide a novel process of treating steel and alloy steel plates, in which the plates are first supercarburized to a greater depth than is possible in existing processes and the over carburized portions are then decarburized preliminary to hardening whereby the hardened plates will have a stratum of glass hard steel of greater depth than has heretofore been possible, and whereby the coarse crystalline structure of such hardened steel is eliminated or greatly reduced, and when desired, is covered with a thin outer layer of decarburized and relatively soft steel.

Figure 7:
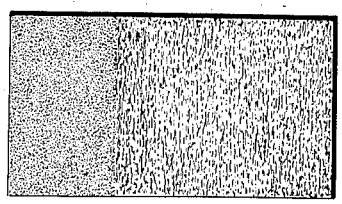
Figure 6:
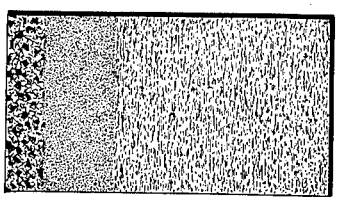
Figure 5:
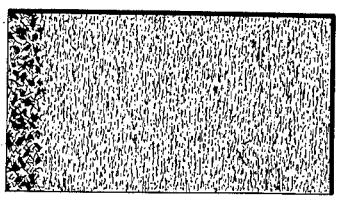
Figure 4:
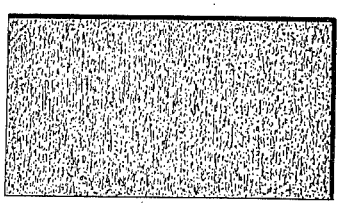

Referring to the accompanying drawings forming part of this specification, Figure 1 is a diagram showing graphically the difference in the carbon content of the steel at various depths from the outer surface thereof in a supercarburized plate which has been decarburized low in accordance with our invention. Fig. 2 is a similar diagram showing in like manner a supercarburized plate after being decarburized to a medium depth in accordance with our invention. Fig. 3 is a similar illustration of a homogeneous plate after having been decarburized. Fig. 4 is a transverse section of a plate showing the structure of the steel when in a fibrous condition. Fig. 5 is a similar section showing the structure after deep supercarburization and prior to water hardening, and plainly indicating the coarse crystalline structure adjacent to the face of the plate. Fig. 6 is a section similar to that shown in Figs. 4 and 5 and showing the structure of the plate of Fig. 5 after the water hardening operation. Fig. 7 is a section similar to that in Figs. 4, 5 and 6 showing the plate after being decarburized and water hardened, and showing plainly the fine tool steel chill resulting from the decarburizing step of our process.

At the present time, steel plates contain a certain percentage of carbon, and various alloys are employed to make alloy steel plates. Such plates are supercarburized so as to obtain about 1.2 per cent. of carbon on the surface, the carbon content gradually decreasing from the face inward until at a depth of one-half inch from the surface the plate contains from .5 per cent. to .9 per cent. of carbon, or a carbon content enabling the plate to take on a glass hardness after hardening to a depth of not exceeding three-fourths of an inch from the surface. It is conceded by those familiar with the manufacture of such supercarburized plates that the glass-hardened portion of the plate is the most essential for some purposes, such as in making armor, as in such case its purpose is to destroy the point of the projectile and keep it from penetrating the remaining portion. Such carburization and depth of glass hardness, however, has heretofore been limited on account of over supercarburizing, which causes a portion thereof to have a very coarse crystalline structure after hardening. This condition is detrimental by reason of having practically no elastic limit and being very low in tensile strength, so that when subjected to the impact of a projectile, the hardened face breaks up and flakes off around the point of impact instead of holding together and more effectively resisting the projectile.

In decarburizing steel and alloy steel plates in accordance with our process, we take plates of almost any composition, preferably containing not over 0.5 per cent. of carbon, and supercarburize such plates by any of the several known methods until at the surface the carburized plates have about 1.5 per cent. carbon, and, at a depth of one and one-half inches from the surface, contain about .5 per cent. carbon. Having secured the desired carbon content at the required depth, the supercarburized portion is then decarburized to a point that will retain a low or medium hardness on the surface after the plates have been hardened, or, in such manner that from one-sixteenth to one-fourth of an inch next to the surface will be softer than the underlying portion down to a specified depth depending on the length of time the plate is maintained at the decarburizing temperature. There are various ways in which the decarburizing operation may be effected and different decarburizing agents and various temperatures may be used to produce the same effect, the best results in the shortest time known to us at this time being obtained by arranging the plates with the surfaces to be decarburized next to a bed of silica sand or finely ground iron ore, and heating the same to a temperature of approximately 1025 degrees centigrade for a specified length of time. To reduce the over supercarburized portion of the plate so as to obtain from .70 to .90 per cent. carbon at the highest point, a medium hardness cannot be retained next to the surface but the surface will be very soft, or contain from .10 to .18 per cent. carbon. To get this surface back to a carbon of say .45 to .80 per cent. it becomes necessary to recarburize the plate by covering it with a carbonaceous material during the heating for reforging, or by the same heat treatment in case the plate is not to be reforged.

To more fully illustrate the state or condition of the four plates illustrated in the drawings after having been treated in accordance with the steps of our process, assume the vertical lines A, B, C, D, E, F, &c., to indicate the amounts or percentages of carbon present, and the horizontal lines, $a$, $b$, $c$, $d$, $e$, $f$, &c., to indicate different depths or distances in inches and fractional parts of an inch inward from the face or surface of the plates.

Referring to Fig. 1 which represents a plate which has first been supercarburized and then decarburized low, there is approximately .10 per cent. of carbon present at the surface; between .30 and .40 per cent. at $b$ or at a depth of $\frac{1}{8}$ of an inch from the surface; .60 per cent. at $c$; .80 per cent. at $d$, between .80 and .90 per cent at $e$; between .70 and .80 per cent. at $f$; .60 per cent. at $g$; .50 per cent at $h$; between .50 and .40 per cent. from $h$ to $j$; and from .40 to .50 per cent. from $j$ to $n$, depending on the carbon in the ingot from which the plate is made.

From the above, it is obvious that the plate shown in Fig. 1 is very soft at its surface but increases in hardness from $a$ to $e$ where it is extremely hard, then gradually decreases in hardness from $e$ to $j$, but still retaining a glass hardness and decreasing in hardness, according to the amount of chill required from $j$ to a point below.

Referring to Fig. 2 which represents a plate which has been supercarburized and then decarburized to a medium depth, it will be seen that there is .40 per cent. of carbon present at the surface and that the carbon content gradually increases from the surface to $e$, where it is highest, then decreases from $e$ to $j$, and from $j$ to $n$ has the same carbon content. The line of hardness will follow the line of carbon to $j$ and then decrease in hardness according to the amount of chill required.

Referring to Fig. 3 which illustrates a homogeneous plate which has been decarburized only, the same gradually increases in the amount of carbon present and in hardness from the surface to $f$. From $f$ to $n$ has the same carbon content but the line of hardness will extend to a point below $f$, according to the amount of chill required in hardening.

From the above description of a decarburized plate, it will readily be seen some of the advantages of this process are, by reason of not having a high supercarburized face, namely; less liability of cracking and spalling or flaking off in manufacture, can be more readily machined and when the plates are employed in making armor plates on account of having a greater depth of glass hardness and tool steel face after hardening, such armor plates will be better fitted to resist the projectiles and will withstand a higher velocity than under the present processes, thus permitting the use of lighter armor having the resistance of plates of heavier gage. The variations in the content of carbon, and depth to which the glass hardness and chill effect extends as herein disclosed are to be regarded merely as approximations, which will vary depending upon the method of carburizing, and decarburizing agents employed and furnaces used in carrying out the process.

Having thus described our invention, what we claim is:—

1. A process of treating steel and alloy steel plates containing a high percentage of carbon on one surface which gradually diminishes from said surface, which consists in decarburizing said plate until the carbon in said surface is lowered and a stratum of soft steel formed on said surface, with a stratum of steel of fine chilled effect formed under said soft steel.

2. A process of treating steel and alloy steel plates which consists in deeply supercarburizing a plate until a coarse crystalline structure is formed at its surface, and then decarburizing the surface to a point sufficient to cause it to retain a certain hardness when the plate is hardened.

3. The method of treating steel consisting in supercarburizing one face thereof, then decarburizing decrementally the supercarburized face and then heating and water quenching the so-treated steel.

4. The method of treating steel consisting in supercarburizing one side thereof, and then decrementally decarburizing the supercarburized face of the steel.

In testimony whereof we have hereunto set our hands in presence of two subscribing witnesses.

ANDREW F. MITCHELL.
WILLIAM H. JONES.

Witnesses:
J. W. KISTLER,
JOS. S. STEWART.